United States Patent
Hunt et al.

(10) Patent No.: US 11,384,880 B2
(45) Date of Patent: Jul. 12, 2022

(54) QUICK CONNECT ASSEMBLY WITH VERIFICATION TAB

(71) Applicant: A. RAYMOND ET CIE, Grenoble (FR)

(72) Inventors: Mitchell Wayne Hunt, Durand, MI (US); Matthew David Lutzke, Clarkston, MI (US)

(73) Assignee: A. RAYMOND ET CIE, Grenoble (FR)

( * ) Notice: Subject to any disclaimer, the term of this patent is extended or adjusted under 35 U.S.C. 154(b) by 229 days.

(21) Appl. No.: 16/869,039

(22) Filed: May 7, 2020

(65) Prior Publication Data

US 2020/0355308 A1 Nov. 12, 2020

Related U.S. Application Data

(60) Provisional application No. 62/844,508, filed on May 7, 2019.

(51) Int. Cl.
*F16L 37/08* (2006.01)
*F16L 37/02* (2006.01)

(52) U.S. Cl.
CPC ............. *F16L 37/025* (2013.01); *F16L 37/08* (2013.01); *F16L 2201/10* (2013.01)

(58) Field of Classification Search
CPC ..... F16L 2201/10; F16L 37/025; F16L 37/08; F16L 37/084; F16L 37/088; F16L 37/0885; F16L 37/12; F16L 37/1225; F16L 37/144
USPC .......................................................... 285/93
See application file for complete search history.

(56) References Cited

U.S. PATENT DOCUMENTS

| | | | |
|---|---|---|---|
| 6,095,570 A * | 8/2000 | Hagen | F16L 37/084 285/321 |
| 7,390,025 B2 | 6/2008 | Pepe et al. | |
| 7,527,303 B2 | 5/2009 | Furuya | |
| 7,578,529 B2 | 8/2009 | Lutzke et al. | |
| 8,240,716 B2 | 8/2012 | Kerin et al. | |

(Continued)

FOREIGN PATENT DOCUMENTS

DE 102009043088 B3 3/2011
WO 2003095884 A1 11/2003
(Continued)

OTHER PUBLICATIONS

Machine assisted English translation of DE102009043088B3 obtained from https://patents.google.com on Sep. 29, 2020, 6 pages.
(Continued)

*Primary Examiner* — Aaron M Dunwoody
(74) *Attorney, Agent, or Firm* — Warner Norcross + Judd LLP

(57) ABSTRACT

A quick connector (QC) assembly comprises a housing defining a fluid passageway extending along an axis at an open end, a retainer ring disposed in the open end and defining a slot, a retainer clip secured to the housing and at least partially disposed within the fluid passageway at the open end, and a verification tab disposed within the slot. The tab is slideably displaceable along the slot between a negative position, where the tab is completely disposed within the housing, and a positive position, where a portion of the tab is visibly disposed above an exterior surface of the housing.

12 Claims, 9 Drawing Sheets

(56) References Cited

U.S. PATENT DOCUMENTS

| | | | |
|---|---|---|---|
| 8,336,919 | B2 | 12/2012 | Gillet et al. |
| 8,944,473 | B2 | 2/2015 | Lutzke et al. |
| 9,115,834 | B2 | 8/2015 | Parks et al. |
| 9,851,035 | B2 | 12/2017 | Hunt et al. |
| 10,167,983 | B2 | 1/2019 | Tomlinson |
| 10,337,656 | B2 | 7/2019 | Tomlinson |
| 10,422,459 | B2 | 9/2019 | Jones et al. |
| 10,473,250 | B2 | 11/2019 | Rusconi et al. |
| 2013/0307263 | A1 | 11/2013 | Parks et al. |
| 2019/0040982 | A1 | 2/2019 | Hagen et al. |
| 2019/0178429 | A1* | 6/2019 | Rohde ................ F16L 37/1225 |
| 2019/0242508 | A1* | 8/2019 | Gaurat ................ F16L 37/0885 |
| 2019/0390808 | A1 | 12/2019 | Trotter et al. |
| 2020/0309298 | A1* | 10/2020 | Kuhn .................... F16L 37/084 |
| 2020/0355308 | A1* | 11/2020 | Hunt .................... F16L 37/088 |
| 2021/0054957 | A1* | 2/2021 | Gocha ................ F16L 37/0885 |
| 2021/0364112 | A1* | 11/2021 | Barthel ............... F16L 37/0985 |
| 2021/0396336 | A1* | 12/2021 | Schröter ............. F16L 37/0841 |
| 2022/0003347 | A1* | 1/2022 | Barthel ............... F16L 37/0885 |

FOREIGN PATENT DOCUMENTS

| | | |
|---|---|---|
| WO | 2016081560 A1 | 5/2016 |
| WO | 2017007567 A1 | 1/2017 |
| WO | 2018102213 A1 | 6/2018 |
| WO | 2020099454 A1 | 5/2020 |

OTHER PUBLICATIONS

Machine assisted English translation of WO2020099454A1 obtained from https://patents.google.com/patent on Aug. 20, 2020, 8 pages.

* cited by examiner

QUICK CONNECT ASSEMBLY WITH VERIFICATION TAB

FIELD OF THE INVENTION

The disclosure generally relates to quick connectors and, more specifically, to quick connectors providing visible indication of proper and/or complete installation during use.

BACKGROUND OF THE INVENTION

Quick connectors are connector assemblies that allow for convenient, quick, fluid-tight connections between two or more pipes, tubes, or similar components. Quick connectors are commonly used in the automotive industry to connect tubing used in engine cooling circuits or, more recently, in cooling circuits used to cool batteries of electric or hybrid vehicles. Quick connectors typically include a female connector for receiving a male connector, or a male connector for receiving a female connector. In operation, when fully disposed within the female connector, the male connector is reversibly locked in position allowing for leak-free fluid communication between a first tube in fluid communication with the female connector and a second tube in fluid communication with the male connector. Unfortunately, many conventional quick connectors suffer from numerous drawbacks associated with locking together the components to be connected, resulting in failed connections, depressurizations, and leaks.

BRIEF SUMMARY

An improved quick connector (QC) assembly for connecting and establishing fluid communication between two components is provided. The QC assembly comprises a housing, a retainer ring, a retainer clip, and a verification tab. The housing defines a fluid passageway extending along a first axis at an open first end and to an open second end. The retainer ring is disposed in the open first end of the housing and defines a slot extending along the first axis. The retainer clip is secured to the housing and at least partially disposed within the fluid passageway at the open first end thereof. The retainer clip is adapted for releasably engaging and retaining a component when inserted into the open first end of the housing. The verification tab is disposed within the slot of the retainer ring. The verification tab is adapted for being slideably displaced along the slot between a negative verification position where the verification tab is completely disposed within the housing and a positive verification position where a portion of the verification tab is visibly disposed above an exterior surface of the housing.

In specific embodiments, the verification tab of the QC assembly is adapted for slideable displacement to the positive verification position when a component is inserted into the open first end of the housing and retained therein by the retainer clip.

In particular embodiments, the verification tab of the QC assembly comprises locking elements that are engageable with retaining elements of the retainer ring and/or housing to lock the verification tab in the positive verification position when slideably displaced thereto.

In particular embodiments, the retainer ring of the QC assembly comprises an anti-rotation element disposed within an anti-rotation slot defined by the housing.

In certain embodiments, the fluid passageway defined by the housing of the QC assembly extends along a second axis at the open second end of the housing. In such embodiments, the first axis and the second axis may be collinear, parallel, or perpendicular with respect to each other such that the housing itself may be I-shaped, U-shaped, L-shaped, or T-shaped.

In specific embodiments, the housing, the retainer ring, and/or the verification tab is independently monolithic in construction.

A method for connecting and establishing fluid communication between two components with the QC assembly is also provided. The method includes slideably displacing the verification tab along the slot and into the positive verification position by inserting an end of a first component into the open first end of the housing until the end of the first component is disposed within the retainer ring and retained in the open first end of the housing by the retainer clip. The method may further include coupling an end of a second component to the open second end of the housing of the QC assembly.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
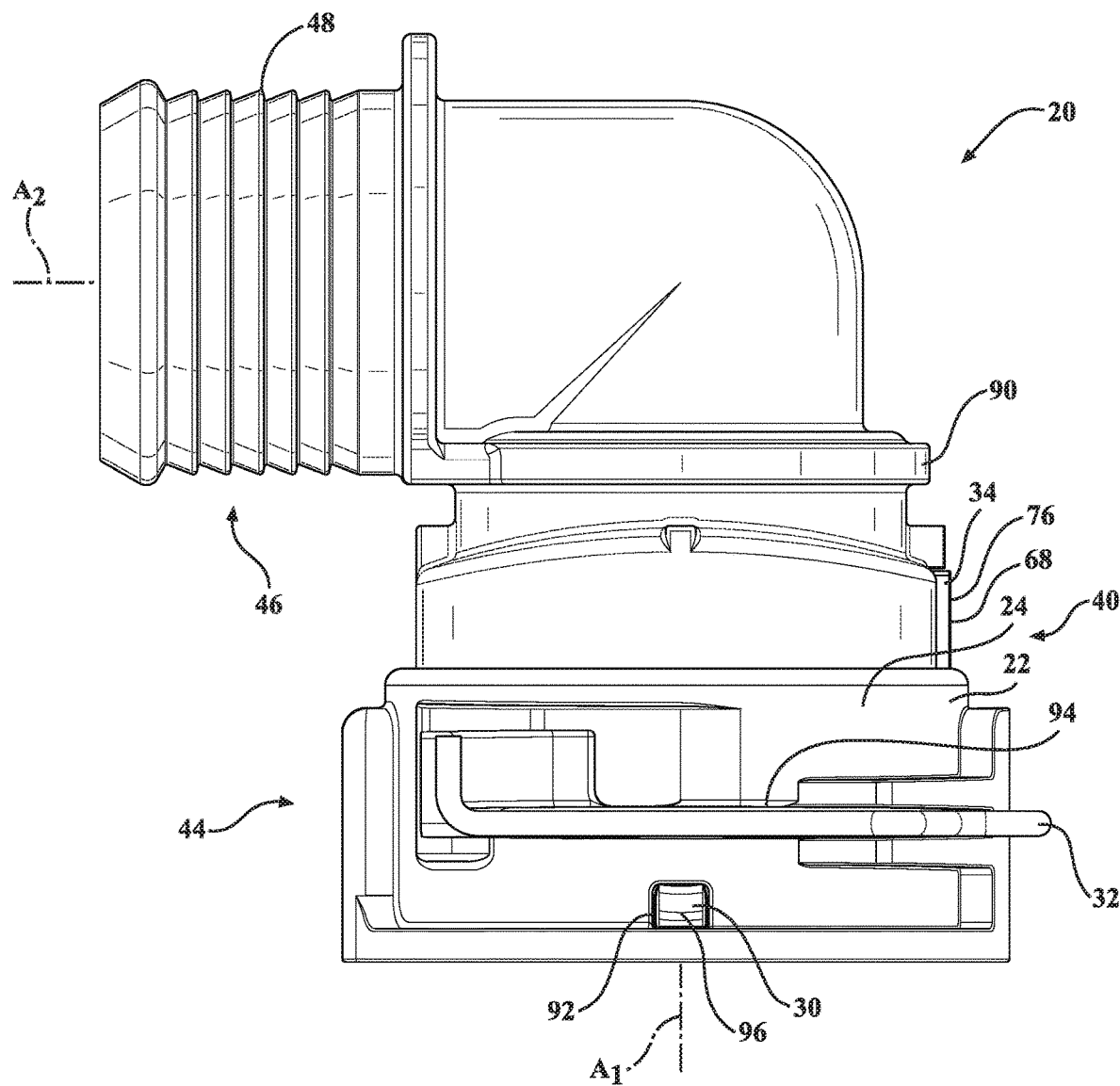
FIG. 1 shows a side view of a quick connector (QC) assembly in accordance with some embodiments of the disclosure.
Figure 2:
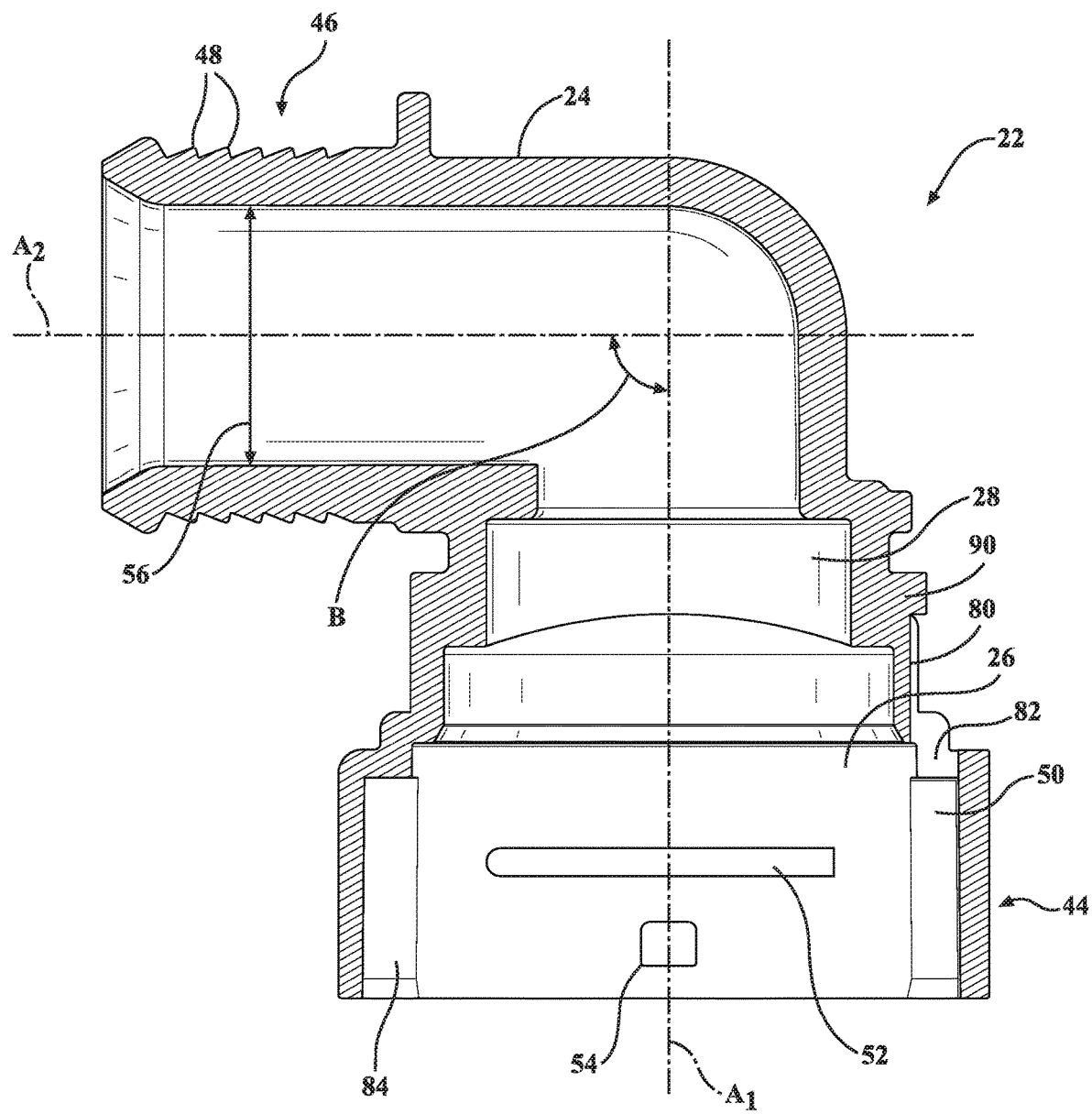
FIG. 2 shows a side cross-sectional view of a coupling housing of the QC assembly in accordance with particular embodiments of the disclosure.

A quick connector assembly is provided. Referring to FIGS. 1-11, wherein like numerals indicate corresponding parts throughout the several views, the quick connector assembly (also referred to as the connector assembly, or QC assembly herein) is illustrated and generally designated at 20. Certain features of the quick connector assembly 20 are functional, but can be implemented in different aesthetic configurations. The quick connector assembly 20 includes a coupling housing 22 (i.e., a housing 22), a retainer ring 30, a retainer clip 32, and a verification tab 34.

The coupling housing 22 comprises an exterior surface 24 and an interior surface 26 that generally defines a fluid passageway 28 (i.e., an open bore 28, alternatively referred to as the passageway 28). In particular, the coupling housing 22 comprises open first and second ends (44, 46), with the fluid passageway 28 extending therebetween. In various embodiments, the open first end 44 of the coupling housing 22 is adapted as a female coupling end 44 (e.g. to cooperatively engage a male end of a component, as shown generally at 38 and described below as the male connector 38). In some such embodiments, the open second end 46 of the coupling housing 22 is adapted as a male coupling end 46 (e.g. to cooperatively engage a female end of a component (not shown)). As such, the open first and second ends (44, 46) may be referred to herein as the female coupling end 44 and the male coupling end 46, respectively. For example, in certain embodiments, the exterior surface 24 proximate to the male coupling end 46 includes a series of coaxial barbs 48 to engage a female end of a pipe or tube (not shown). In some embodiments, while not shown, the quick connector assembly 20 includes a plurality of female coupling ends 44 and/or a plurality of male coupling ends 46.

In general, the fluid passageway 28 fluidly connects the female coupling end 44 to the male coupling end 46 and the fluid passageway 28 allows fluid to exit or enter from the coupling housing 22 through the female coupling end 44 and the male coupling end 46. In particular, the fluid passageway 28 extends along a first axis $A_1$ (alternatively referred to as the coupling axis $A_1$) at the female coupling end 44 and along a second axis $A_2$ at the male coupling end 46. The first and second axes ($A_1$, $A_2$) may be collinear, parallel, perpendicular, etc. with respect to each other. As such, the coupling housing 22 itself may conform to a variety of sizes, shapes or configurations, and may be I-shaped, U-shaped, L-shaped, T-shaped, or the like.

In various embodiments, the passageway 28 is cylindrical in cross-section or oval or square in cross-section. In some embodiments, the coupling axis $A_1$ forms an angle B with the second axis $A_2$. In specific embodiments, the angle B is equal to 0°, 45°, or 90°. In particular embodiments, the fluid passageway 28 includes a minimum diameter 56 equal to from 4 to 70 mm, alternatively from 8 to 50 mm. The coupling housing 22 includes a first anti-rotation slot 50 defined by the interior surface 26 and running parallel to the coupling axis $A_1$. In various embodiments, the coupling housing 22 includes a second anti-rotation slot 84. In some embodiments, the first anti-rotation slot 50 defines a first width that is greater than a second width defined by the second anti-rotation slot 84. In some embodiments, the second anti-rotation slot 84 is defined by the coupling housing 22 at a position radially opposed to the first anti-rotation slot 50 with respect to the coupling axis $A_1$.

In certain embodiments, the female coupling end 44 of the coupling housing 22 defines a first retainer-clip slot 52 and/or a first locking aperture 54, which is described further below. The first retainer-clip slot 52 is generally disposed perpendicular to the coupling axis $A_1$. As described further below, the first retainer-clip slot 52 allows the retainer clip 32 to establish lockable engagement with the male connector 38 (i.e., a male end of a component, as introduced above) disposed within the quick connector assembly 20. In certain embodiments, the female coupling end 44 further defines a second locking aperture 92 and a second retainer-clip slot 94. In particular embodiments, the second locking aperture 92 and the second retainer-clip slot 94 are respectively defined by the coupling housing 22 at positions radially opposed to the first locking aperture 54 and the first retainer-clip slot 52 with respect to the coupling axis $A_1$.

Figure 3:
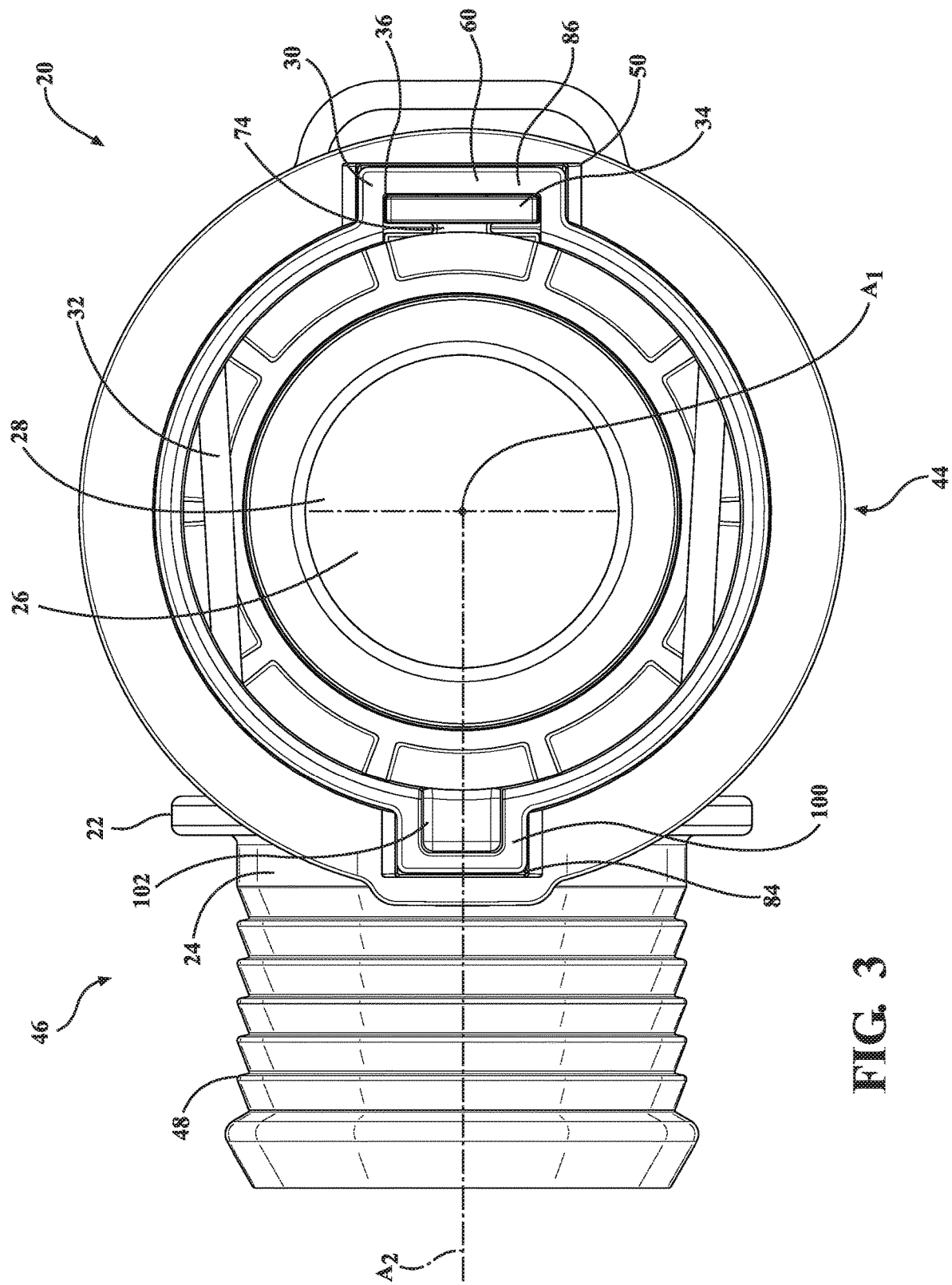
FIG. 3 shows a bottom view of the QC assembly in accordance with some embodiments of the disclosure.
Figure 8:
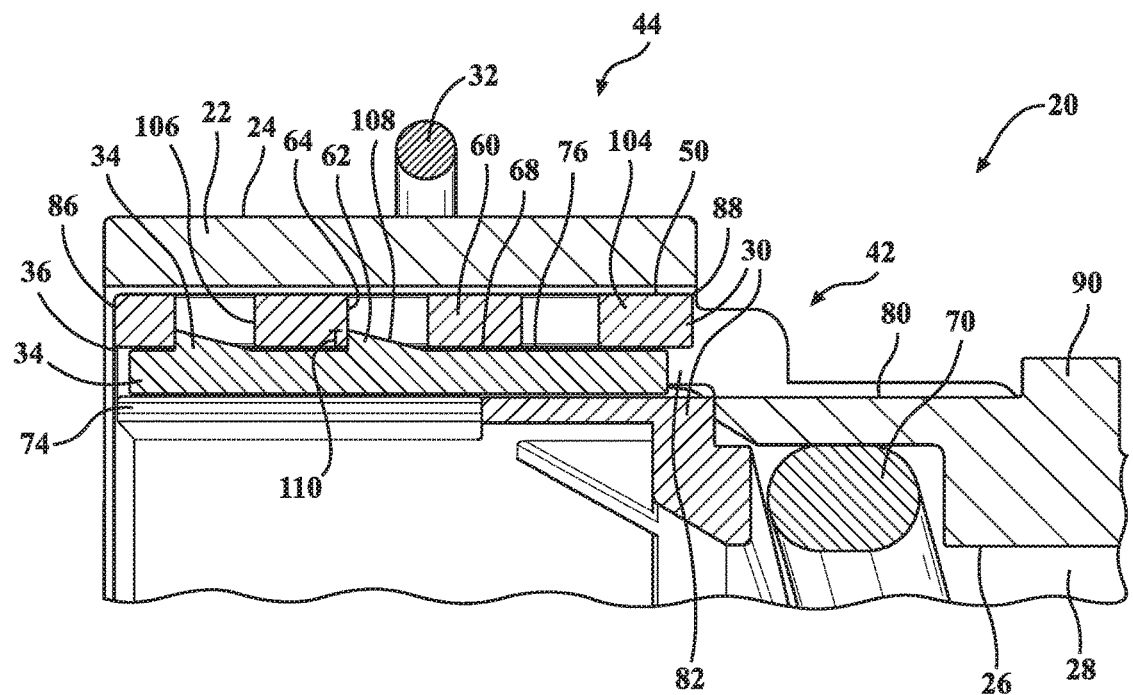
FIG. 8 shows a partial cross-sectional view of the QC assembly having the verification tab in a negative verification position in accordance with certain embodiments of the disclosure.
Figure 9:
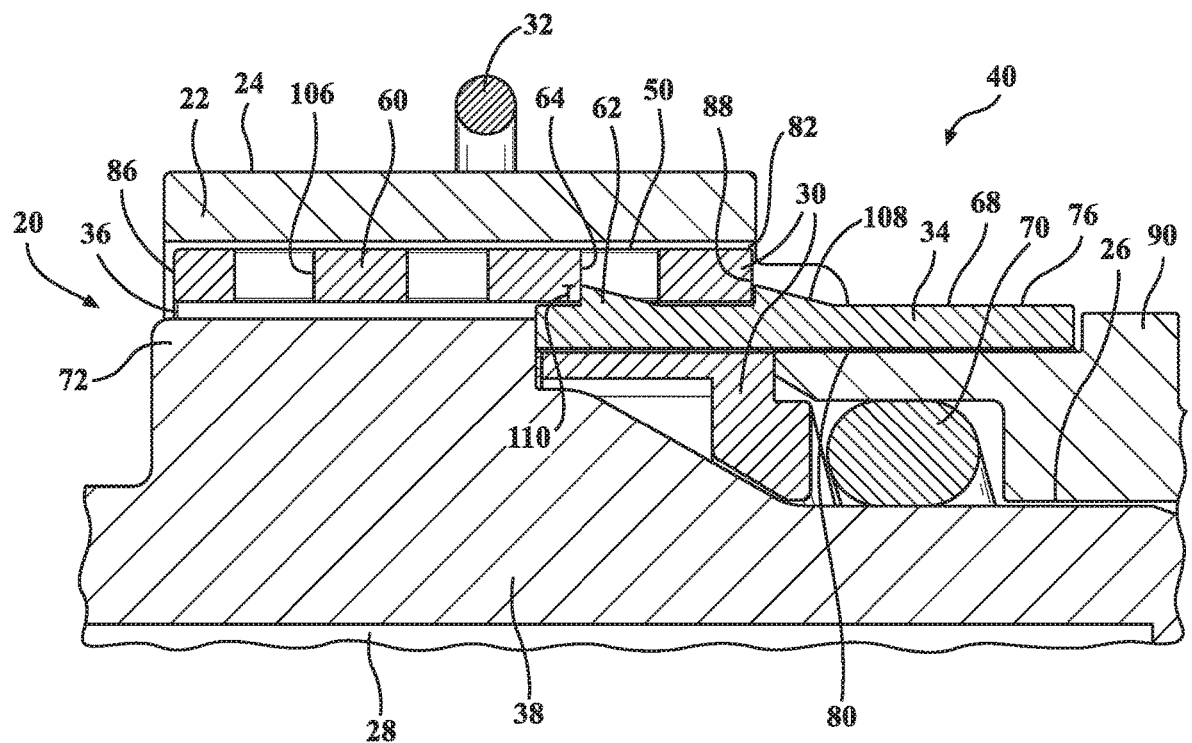
FIG. 9 shows a partial cross-sectional view of the QC assembly having the verification tab displaced by a male connector and disposed in a positive verification position in accordance with particular embodiments of the disclosure.

The retainer ring 30 is generally cylindrical in shape and extends about an internal bore along an axis $A_3$ (i.e., a retainer ring axis $A_3$). As an individual component the retainer ring 30 is dimensioned to be insertable within the open first end 44 of the housing 22 and also engageable with certain elements thereof More specifically, in the connector assembly 20, the retainer ring 30 is disposed coaxially within the female coupling end 44 of the coupling housing 22 such that the retainer ring 30 is in physical contact with the interior surface 26 of the coupling housing 22, as shown in FIGS. 3, 8, and 9. Said differently, the retainer ring 30 is generally disposed in the open first end 44 of the housing 22 and coaxially about the first axis $A_1$. As described in additional detail below, the retainer ring 30 defines a slot 36 (also referred to as the verification tab slot 36) extending along the first axis $A_1$. Typically, the slot 36 also extends along the retainer ring axis $A_3$, such that the axes $A_1$ and $A_3$ are generally parallel to each other.

The retainer ring 30 may be secured within the coupling housing 22 with or without an adhesive (e.g. a cement, glue, epoxy, etc.). In certain embodiments, the retainer ring 30 includes a first locking barb 58 (alternatively referred to as the locking tab 58) that engages the first locking aperture 54 to cooperatively secure (i.e., lock) the retainer ring 30 within the coupling housing 22 and prevent removal of the retainer ring 30 therefrom. In various embodiments, the retainer ring 30 includes a second locking barb 96 that locks within the second locking aperture 92 to secure the retainer ring 30 within the coupling housing 22 and prevent removal of the retainer ring 30 from the coupling housing 22.

In certain embodiments, the retainer ring 30 defines a first anti-rotation element 60 received within and in physical contact with the first anti-rotation slot 50 of the housing 22. In some such embodiments, the first anti-rotation element 60 includes defines the verification tab slot 36, or at least a portion of the verification tab slot 36. In various embodiments, the retainer ring 30 defines a second anti-rotation element 100 received within and in physical contact with the second anti-rotation slot 84 of the housing 22.

In some embodiments, the retainer ring 30 defines retaining elements 64 (alternatively referred to as the engagement elements 64). In general, the engaging elements 64 are surfaces or shelves defined by a portion(s) of the verification tab slot 36 most proximal the interior surface 26 of the coupling housing 22. In certain embodiments, the engaging elements 64 are defined by or extend from a wall, or a plurality of walls, of the verification tab slot 36. For example, in some embodiments, the engaging elements 64 are defined by or form part of an engagement aperture 106, an engagement recess, an engagement tab 104, or an engagement shelf defined within or extending from a wall of the verification tab slot 36. In various embodiments, the engagement aperture 106, engagement recess, or engagement tab 104, or engagement shelf defines a cross-sectional shape with respect to a plane either parallel to or perpendicular to the coupling axis $A_1$, for example, a square, a circle, a triangle, a rectangle, a diamond, or any of various polygonal shapes. In certain embodiments, the engaging element 64 is defined by a surface of a tab 104 extending along the coupling axis $A_1$ from the wall of the verification tab slot 36.

Figure 4:
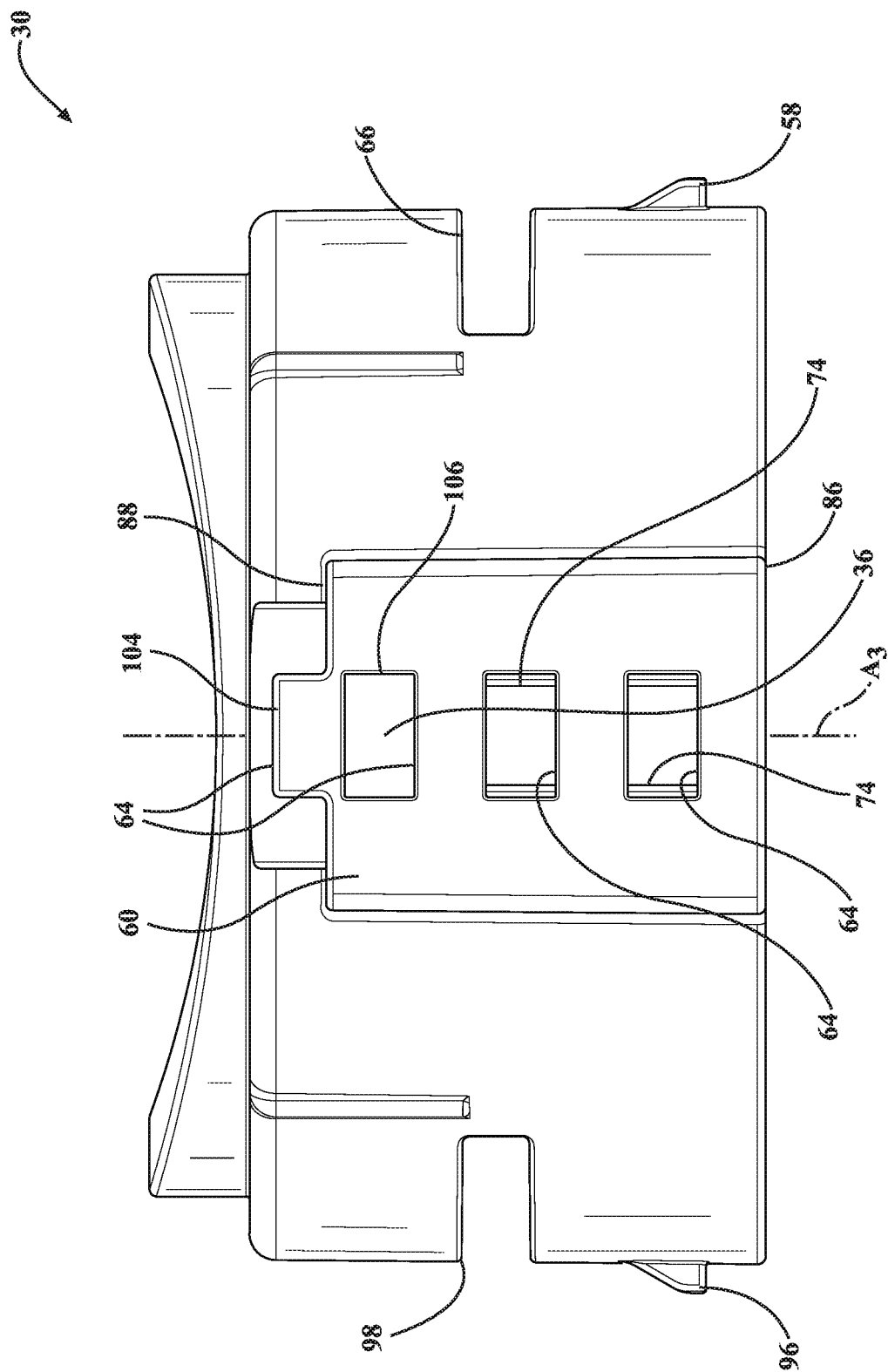
FIG. 4 shows a side view of a retainer ring of the QC assembly in accordance with certain embodiments of the disclosure.
Figure 5:
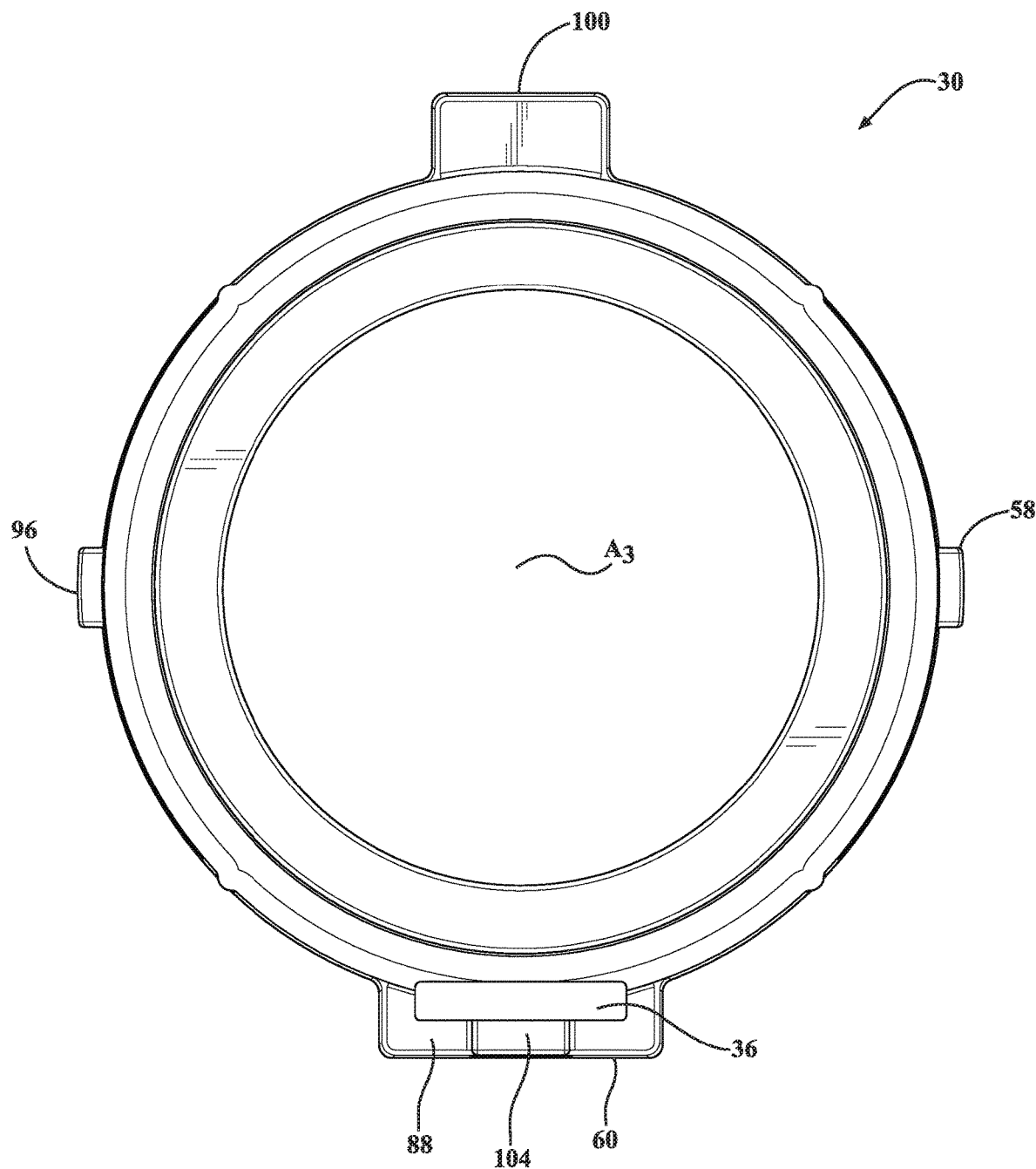
FIG. 5 shows a top view of the retainer ring of FIG. 4.

In some embodiments, the verification tab slot 36 includes 2, 3, 4, or 5 engaging elements 64. In certain embodiments, the verification tab slot 36 includes non-identical engaging elements 64, such as engaging elements 64 defined by a combination of an engagement tab(s) 104 and an engagement aperture(s) 106, as shown in FIG. 4.

In some embodiments, a portion of a wall of the verification tab slot 36 extending in the direction of the coupling axis $A_1$ includes a cross-section defining a first engagement slot 74 (alternatively referred to as the alignment slot 74), as describe further below and as shown in FIGS. 3 and 8, which conforms to a cross-section of a T-slot (i.e., such that the verification tab slot 36 comprises a T-slot running parallel to the coupling axis $A_1$).

In general, the retainer ring 30 includes a retainer-clip slot 66, which may be referred to as the third retainer-clip slot 66, e.g. in conjunction with the first and second retainer-clip slots (52, 94) of the housing 22. The third retainer-clip slot 66 of the retainer ring 30 is generally aligned with the first retainer-clip slot 52 of the housing 22 to allow passage of the retainer clip 32 (or a portion thereof) therein. Likewise, in various embodiments, the retainer ring 30 includes a fourth retainer-clip slot 98 that aligns with the second retainer-clip slot 94 (if present) of the housing 22.

Figure 10:
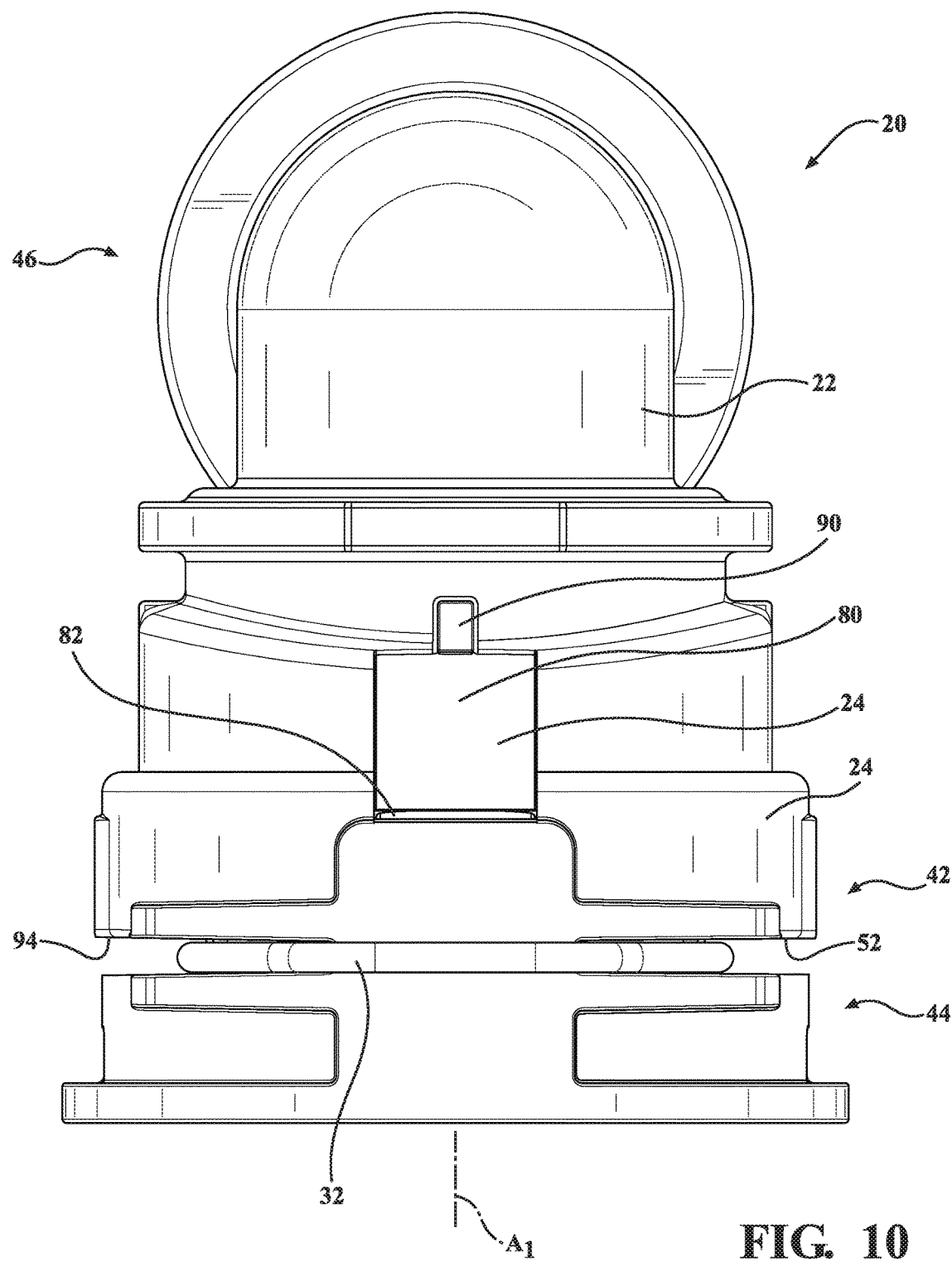
FIG. 10 shows an end view of the QC assembly with the verification tab disposed in the negative verification position in accordance with certain embodiments of the disclosure.
Figure 11:
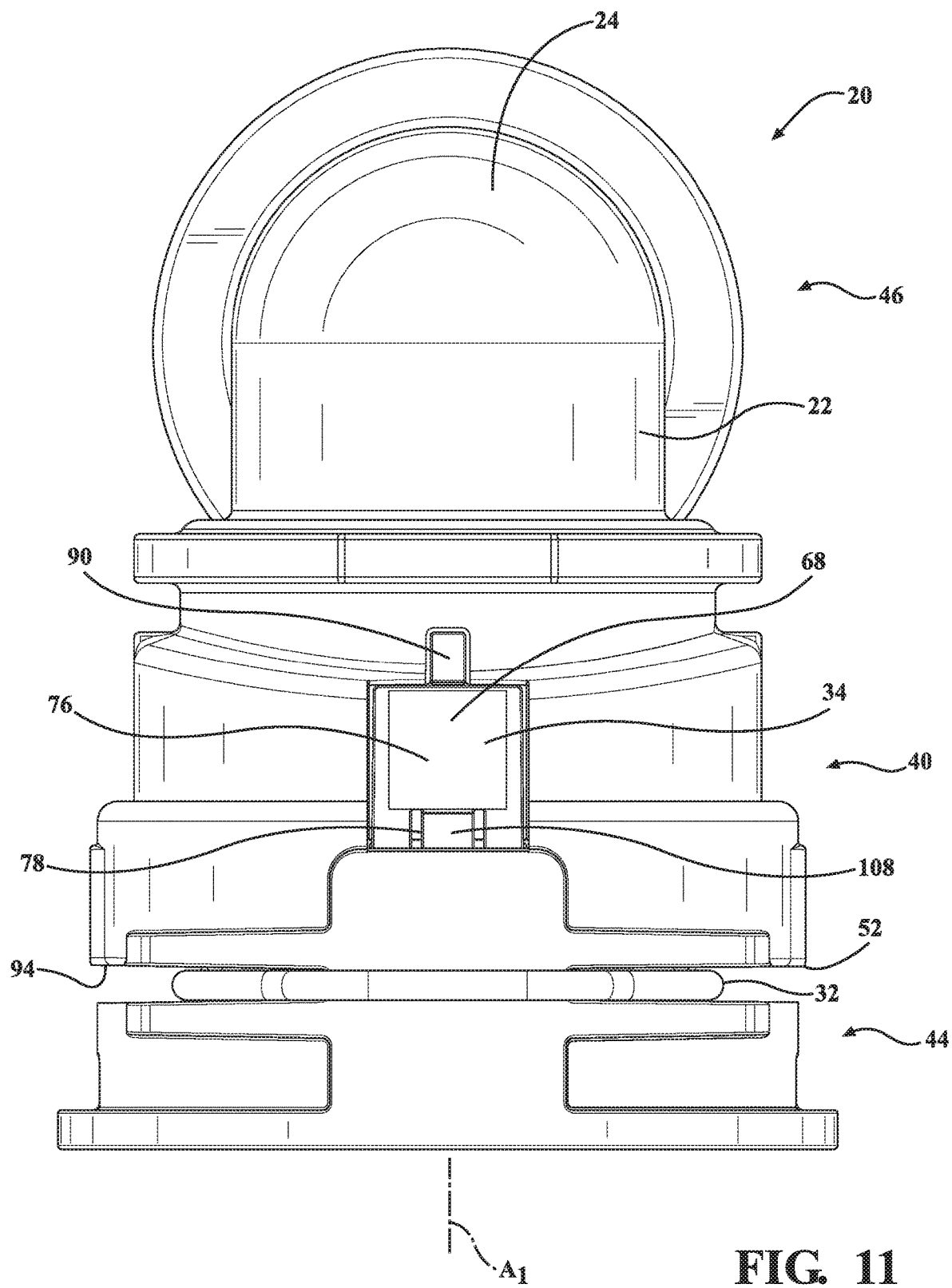
FIG. 11 shows the end view of the QC assembly of FIG. 10 with the verification tab disposed in the positive verification position and thus visible above an exterior surface of the coupling housing in accordance with certain embodiments of the disclosure.

The retainer clip 32 is not limited, and may be a separate component or integral with another component of the QC assembly 20, such as the housing 22, the retainer ring 30, etc. In some embodiments, the retainer clip 32 is a generally C-shaped or D-shaped spring. In some embodiments, as shown in FIGS. 1, 10, and 11, the retainer clip 32 is generally received within the first retainer-clip slot 52 and the second retainer-clip slot 94. The retainer clip 32 may be secured around the exterior surface 24 of the coupling housing 22 in a locked configuration, as shown in FIGS. 1, 3, and 10, or in an unlocked configuration (not shown). In the unlocked configuration, the retainer clip 32 is in physical contact with the exterior surface 24 and the retainer clip 32 and not generally disposed within the first retainer-clip slot 52 or the second retainer-clip slot 94.

In certain embodiments, the quick connector assembly 20 includes a sealing element 70 that is secured in position by the retainer ring 30, as shown in FIGS. 8 and 9. In some embodiments, the sealing element 70 is sandwiched between the sealing element 70 and the interior surface 26 of the coupling housing 22. In particular embodiments, the sealing element 70 is an O-ring or the like, such as an X-ring, square ring, or other similar type of sealing element.

Figure 6:
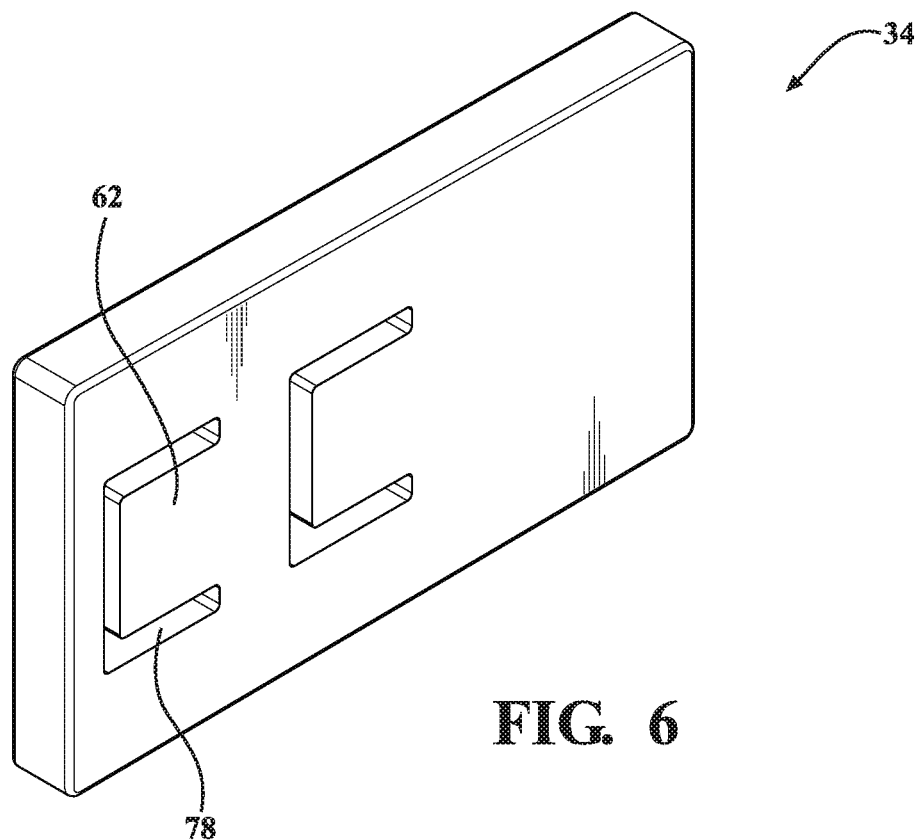
FIG. 6 shows a back perspective view of a verification tab of the QC assembly in accordance with some embodiments of the disclosure.
Figure 7:
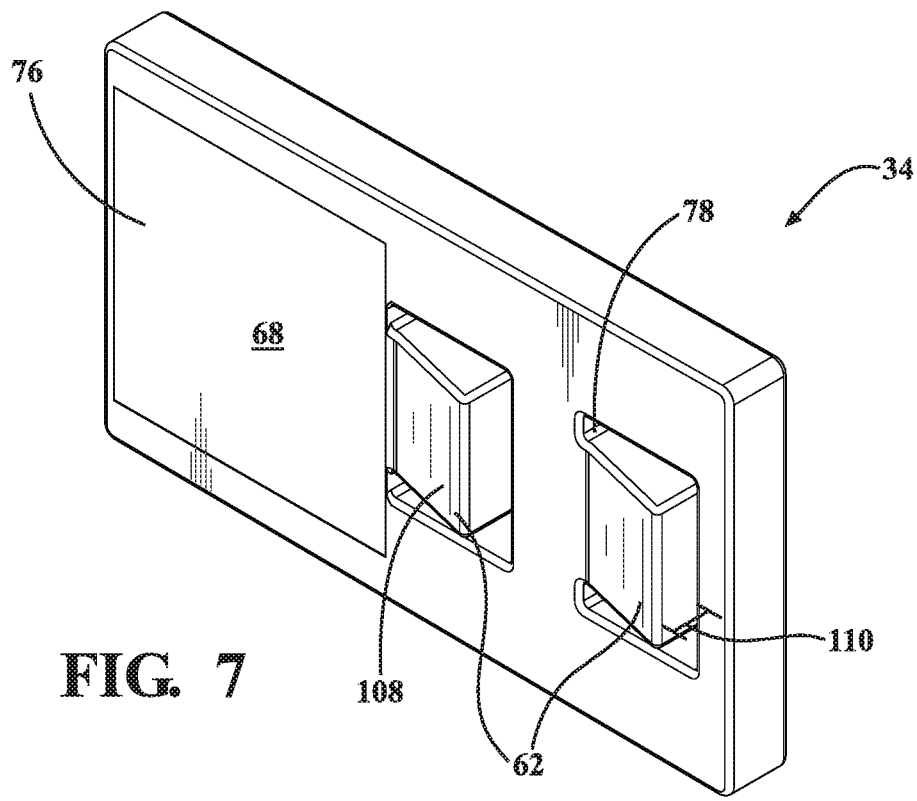
FIG. 7 shows a front perspective view of the verification tab of FIG. 6.

As introduced above, the quick connector assembly 20 includes the verification tab 34. In general, the verification tab 34 is disposed within the verification tab slot 36 of the retainer ring 30, and is adapted for being slideably displaced along the slot 36 between a negative verification position 42 and a positive verification position 40. More specifically, in the negative verification position 42 the verification tab 34 is completely disposed within the housing 22 and not readily visible to a user, whereas in the positive verification position 40 the verification tab 34 is visibly disposed above an exterior surface 24 of the housing 22 and readily visible to a user. An exemplary verification tab 34, as utilized in certain embodiments of the connector assembly 20, is shown in FIGS. 6 and 7. In some embodiments, the verification tab 34 is prismatic in shape. However, it will be appreciated that the verification tab slot 36 may comprise any shape, and is adapted to receive and secure the verification tab 34 (or a portion thereof) therein. For example, in various embodiments, the verification tab 34 comprises a cylindrical cross-section, circular cross-section, triangular cross-section, or rectangular cross-section. In general, however, the verification tab 34 may conform to any of various polygonal shapes and/or cross-sections, which will readily be selected by one of skill in the art in view of the description herein.

As will be appreciated from the description herein, the verification tab 34 is generally slideably displaceable along the coupling axis $A_1$ and optionally along the retainer ring axis $A_3$ within the verification tab slot 36 introduced above. Typically, the verification tab slot 36 includes a first end 86 and a second end 88. In various embodiments, the verification tab slot 36 is fully or partially sealed at the first end 86 such that no portion of the verification tab 34 may slide past the first end 86 in a direction away from the second end 88 without being physically obstructed from so doing. In some embodiments, the verification tab slot 36 physically contacts four adjacent faces defining a perimeter of the verification tab 34.

In general, the verification tab 34 is lockably engageable with the verification tab slot 36 to be lockably secured in the positive verification position 40 or in the negative verification position 42 as described above, or in a single or a plurality of positions intermediate therebetween. As such, in certain embodiments, the verification tab 34 includes one or more locking elements 62 (e.g. 1, 2, 3, or more locking elements 62) that are engageable with retaining elements 64 of the retainer ring 30 and/or retaining elements (not shown) of the housing 22 to lock the verification tab 34 in the positive verification position 40 when slideably displaced thereto. Accordingly, in such embodiments, the locking element(s) 62 are engageable with retaining elements 64 of the retainer ring 30. For example, as shown in FIGS. 8 and 9, the locking elements 62 and the engaging elements 64 only allow the verification tab 34 to freely move from the negative verification position 42 to the positive verification position 40 and, thus, prohibit free sliding of the verification tab 34 in the opposite direction (i.e., from the positive verification position 40 to the negative verification position 42) without the use of more force (e.g. at least 1.5, 2, 5, or 10 times more force) than is necessary to move the verification tab from the negative verification position 42 to the positive verification position 40.

In certain embodiments, each locking element 62 is independently a nub, barb, protrusion (which may conform to any of various geometries including cuboid, prismatic, diamond, triangular, or pyramidal), or dimple (e.g. a hemispherical dimple) extending from the verification tab surface 68. In some embodiments, each locking element 62 is an angled tab protruding from a verification tab surface 68. In some such embodiments, each locking element 62 is surrounded on three sides by a U-shaped aperture 78, as shown in FIGS. 6, 7, and 11. In other embodiments, the locking elements 62 are not surrounded by any aperture, as shown in FIGS. 8 and 9. In particular embodiments, the locking elements 62 include a locking element surface 108, which generally defines a shape, such as a triangle, a square, a U-shape, a circular shape, or any of various other polygonal shapes, and may include serrations and/or be textured. For example, in certain embodiments, the locking element surface 108 forms an acute angle with respect to the verification tab surface 68. In certain embodiments, the locking element surface 108 includes a maximum distance 110 from the verification tab surface 68, which may be measured from a point of the locking element surface 108 most proximal to the first end 86 of the verification tab slot 36. In certain embodiments, the maximum distance 110 may be measured from an intermediate point of the locking element surface 108 not corresponding to an end thereof, such as a center point. In various embodiments, the verification tab 34 includes non-identical locking elements 62 such as a combination of locking elements 62 conforming to different geometries. In some embodiments, the locking elements 62 extend from a plurality of surfaces of the verification tab 34.

In certain embodiments, the verification tab 34 cannot be slidably displaced from the positive verification position 40 to the negative verification position 42 without use of a tool, such as a screw-head or a specially designed tool. As such, however, the verification tab 34 may be reversibly slideably displaced along the slot 36 between a negative verification position 42. For example, in some embodiments, the verification tab 34 is slideably displaceable by hand from the positive verification position 40 to the negative verification position 42 with or without use of a tool, such as a screwhead or a specially designed tool. Typically, however, as described above, the verification tab 34 cannot freely slide from the positive verification position 40 to the negative verification position 42 without application of force, e.g. on account of the locking elements 62 engaging the engaging elements 64 when the verification tab 34 is in the positive verification position 40 (i.e., when the locking elements 62 are received/engaged by the engaging elements 64 to establish a locking engagement therewith).

When in the positive verification position 40, the verification tab 34 is visibly disposed above the exterior surface 24 of the coupling housing 22. In various embodiments, the coupling housing 22 includes a verification tab support surface 80 to support a surface/face of the verification tab 34 and a verification tab slit 82 through which the verification tab 34 may exit from an interior space defined by the interior surface 26 of the coupling housing 22 to an exterior space defined by the exterior surface 24 of the coupling housing 22. The verification tab 34 is conspicuously visible from the exterior space when disposed in the positive verification position 40.

In various embodiments, the verification tab 34 includes an indication surface 76. The indication surface 76 may be any of various colors including yellow, green, red, white, blue, black, orange, purple, or any of various other colors including various hues obtained through mixing of various pigments or dyes corresponding to such colors or any of various other colors known in the art. The indication surface 76 may include reflective tape disposed thereupon or a sticker or a printing displaying a pattern, color, a bar code, reflective material, or alphanumeric label or message. In some embodiments, the indication surface 76 functions to enhance the visibility of the verification tab 34 when the verification tab 34 is in the verification position 40. In certain embodiments, the verification tab 34 is the same color as the indication surface 76 or the verification tab 34 is a different color than the indication surface 76. In particular embodiments, the indication surface 76 is so colored as to be conspicuously visible against the exterior surface 24 of the coupling housing 22. In various embodiments, the indication surface 76 is of a different color than the verification tab 34.

In some embodiments, the indication surface 76 includes a code, such as a one-dimensional barcode (e.g. UPC code, EAN code, code 39, code 128, ITF, code 93, codabar, GS1 databar, MSI Plessey, etc.), a two-dimensional barcode (e.g. QR code, datamatrix code, PDF417, AZTEC, etc.), a holographic code, a human-readable alpha-numeric code, other codes known in the art and interpretable by machine and/or human. Additional examples of such codes include linear bar codes such as those known or otherwise characterized as Australia Post barcode, Codabar, Code 25-Non-interleaved 2 of 5, Code 25 Interleaved 2 of 5, Code 11, Farmacode (i.e., Code 32), Code 39, Code 49, Code 93, Code 128, CPC binary, EAN 2, EAN 5, EAN-8, EAN-13, GS1-128, GS1 DataBar, ITF-14, JAN, Japan Post bardcode, KarTrak ACI, MSI, Pharmacode, PLANET, Plessey, PostBar, POSTNET, RM4SCC/KIX, RM Mailmark L, Telepen, or Universal Product Code, matrix bar codes such as those known or otherwise characterized as AR code, Aztec Code, BEEtag, Bee Tagg, Bokode, Code 1, Code 16K, ColorCode, Color Construct Code, Cronto Visual Cryptogram, CyberCode, d-touch, DataGlyphs, Data Matrix, Datastrip Code, Digimarc Barcode, DotCode, DotCode A, DWCode, EZcode, Han Xin Barcode, High Capacity Color Barcode, HueCode, InterCode, JAB-Code, MaxiCode, mCode, MMCC, NexCode, PDF417, Qode, QR code, ShotCode, Snowflake Code, SPARQCode, or Trillcode, and the like, or any combination thereof.

In addition to the elements above, the coupling housing 22 includes a blocking tab 90, a blocking flange, or any of various other forms of a physical barrier that prevents the verification tab 34 from being displaced beyond a predetermined point such that the verification tab 34 cannot be slideably displaced within the verification tab slot 36 in the direction of the second end 88 beyond a point defined by the blocking tab 90. In various embodiments, the blocking tab 90 or a functional equivalent thereof functions in combination with the verification tab slot 36 to ensure that the verification tab 34 cannot be removed or be forced from the quick connector assembly 20, e.g. by being slid or displaced in the direction of the second end 88 of the verification tab slot 36. In some embodiments, the verification tab 34 cannot be removed from the quick connector assembly 20 through the second end 88 of the verification tab slot 36.

As shown in FIGS. 8 and 9, a method of using the quick connector assembly 20 includes inserting the male connector 38 (e.g. the male end of a component, as introduced above) within the female coupling end 44 of the connector assembly 20. Fully inserting the male connector 38 within the female coupling end 44 includes necessarily displacing the verification tab 34 along the coupling axis $A_1$ from the negative verification position 42, as shown in FIGS. 8 and 10, to the positive verification position 40, as shown in FIGS. 9 and 11. Inserting the male connector 38 within the female coupling end 44 includes aligning an axis of the male connector 38 with the coupling axis $A_1$, thereby also aligning an alignment flange 72 of the male connector 38 within a first engagement slot 74 defined by a portion of the verification tab slot 36 most distal to the interior wall 26 of the coupling housing 22. Likewise, fully inserting the male connector 38 within the connector assembly 20 (e.g. within the housing 22 thereof) includes the alignment flange 72 being received by the engagement slot 74 and impacting an end of the verification tab 68 and thereby displacing the verification tab 68 from the negative verification position 42 to the positive verification position 40. In various embodiments, when the alignment flange 72 is disposed within the engagement slot 74 the alignment flange 72 works in combination with the engagement slot 74 to prevent rotation of the male connector 38 within the quick connector assembly 20. In some such embodiments, the engagement slot 74 extends along only a portion of a major dimension of the retainer ring 30 measured along the axis $A_3$, such as less than 90%, less than 80, alternatively less than 75 percent of the full extent of the major dimension.

In some embodiments, the retainer ring 30 defines a second engagement slot 102 for receiving a second alignment flange (not shown) defined by the male connector 38.

In certain embodiments, the second engagement slot 102 is defined within the second anti-rotation element 100.

The method includes ensuring that the retainer clip 32 is disposed in the locked configuration prior to fully inserting the male connector 38 into the female coupling end 44 of the connector assembly 20 as described above. Full insertion of the male connector 38 generally includes the retainer clip 32 snapping into a locked engagement with the male connector 38 when the male connector 38 is properly and fully inserted within the quick connector assembly 20. In the locked configuration, the retainer clip 32 engages with an annular space defined by the male connector 38 preventing withdrawal of the male connector 38 from the quick connector assembly 20. It will be understood from the above that, following full insertion of the male connector 38 into the female coupling end 44, the verification tab 34 is displaced into the positive verification position 40. When the male connector 38 is fully inserted within the quick connector assembly 20, as shown in FIG. 9, the sealing element 70 and retainer ring 30 cooperate to establish a fluid-tight seal between the male connector 38 and the coupling housing 22.

Removing the male connector 38 from the quick connector assembly 20, includes moving the retainer clip 32 to the unlocked configuration such that the retainer clip 32 no longer is in a locked engagement with the male connector 38. Removing the male connector 38 further includes withdrawing the male connector 38 from the female coupling end 44 of the quick connector assembly 20.

The verification tab 34 has the advantage of providing a visible signal as to when the male connector 38 has been fully and properly inserted within the quick connector assembly 20. The verification tab 34 provides confirmation that a connection has been made between the male connector 38 and the quick connector assembly 20. The indication surface 76 may include a machine-readable code, as described supra, that may be read by a scanning device to verify and document proper installation of the male connector 38 within the quick connector assembly 20.

The various elements of the components of the quick connector assembly 20 described above, e.g. the coupling housing 22, the retainer ring 30, the verification tab 34, the sealing element 70, and the retainer clip 32, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the quick connector assembly 20 (e.g. the housing 22, the retainer ring 30, the retainer clip 32, the verification tab 34, etc.) is monolithic in construction.

In general, materials suitable for use in or as the coupling housing 22, the retainer ring 30, the verification tab 34, the sealing element 70, and the retainer clip 32 include metals (e.g. steels, aluminums, alloys, etc.), resins (e.g. thermoset and/or thermoplastic resins), rubbers/elastomers, and combinations thereof. However, myriad materials may be used to manufacture the elements of the quick connector assembly 20, each typically selected as a function of availability, cost, performance/end use applications, etc. Moreover, metals, metal alloys, rubbers/elastomers, and resins are not exhaustive of suitable materials that may be used. In general, the retainer clip 32 comprises a metal, such as a steel. However, the retainer clip 32 may comprise any number of materials suitable for providing the retainer clip 32 with deformable resiliency.

In certain embodiments, the quick connector assembly 20 comprises a resin, such as a thermoplastic and/or thermoset resin. In such embodiments, the coupling housing 22, the retainer ring 30, the verification tab 34, the sealing element 70, and/or the retainer clip 32 may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the quick connector assembly 20 comprise material suitable for use under continuous exposure to temperatures of from −40° C. to 120° C., or from −40° C. to 135° C. and/or pressures of from 0.5 to 2 bar. In certain embodiments, one or more, alternatively all, of the various components of the quick connector assembly 20 comprises materials that can withstand up to 30 minutes, alternatively more than 30 minutes, of exposure to temperatures of up to 150° C. without irreversible harmful effects (e.g. melting, etc.). In some embodiments, the coupling housing 22 comprises a synthetic or natural rubber or polyamide. In some embodiments, the sealing element 70 comprises an ethylene-propylene rubber or of thermoplastic polyolefin. In some embodiments, the retainer ring 30 has a lower durometer than the coupling housing 22 and/or the verification tab 34.

With regard to composition of the particular components of the quick connector assembly 20 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the particular components of the quick connector assembly 20 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the quick connector assembly 20 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the quick connector assembly 20 comprises a fiberglass.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A connector assembly for connecting and establishing fluid communication between two components, comprising:
    a housing defining a fluid passageway extending along a first axis at an open first end and to an open second end;
    a retainer ring disposed in the open first end of the housing and coaxially about the first axis, the retainer ring defining a slot extending along the first axis;
    a retainer clip secured to the housing and at least partially disposed within the fluid passageway at the open first end, the retainer clip being adapted for releasably engaging and retaining a component when inserted into the open first end; and
    a verification tab disposed within the slot of the retainer ring, the verification tab adapted for being slideably displaced along the slot between a negative verification position where the verification tab is completely disposed within the housing and a positive verification position where a portion of the verification tab is visibly disposed above an exterior surface of the housing.

2. The connector assembly of claim 1, wherein the verification tab is adapted for slideable displacement to the positive verification position when a component is inserted into the open first end and retained therein by the retainer clip.

3. The connector assembly of claim 1, wherein the verification tab comprises locking elements that are engageable with retaining elements of the retainer ring and/or housing to lock the verification tab in the positive verification position when slideably displaced thereto.

4. The connector assembly of claim 1, wherein the retainer ring comprises an anti-rotation element disposed within an anti-rotation slot defined by the housing.

5. The connector assembly of claim 1, wherein: (i) the fluid passageway defined by the housing extends along a second axis at the open second end; (ii) the housing is I-shaped, U-shaped, L-shaped, or T-shaped; or (iii) both (i) and (ii).

6. The connector assembly of claim 1, wherein: (i) the housing is monolithic in construction; (ii) the retainer ring is monolithic in construction; (iii) the verification tab is monolithic in construction; or (iv) any of (i)-(iii).

7. A method for connecting and establishing fluid communication between two components, comprising:
    providing the connector assembly of claim 1; and slideably displacing the verification tab along the slot and into the positive verification position by inserting an end of a first component into the open first end of the housing until the end of the first component is disposed within the retainer ring and retained in the open first end by the retainer clip.

8. The method of claim 7, further comprising coupling an end of a second component to the open second end of the housing of the connector assembly.

9. The method of claim 7, wherein the verification tab comprises locking elements that are engageable with retaining elements of the retainer ring and/or housing, and wherein slideably displacing the verification tab along the slot and into the positive verification position further comprises engaging the retaining elements of the retainer ring and/or housing with the locking elements of the verification tab to thereby lock the verification tab in the positive verification position.

10. The method of claim 7, wherein the retainer ring comprises an anti-rotation element disposed within an anti-rotation slot defined by the housing.

11. The method of claim 7, wherein: (i) the fluid passageway defined by the housing extends along a second axis at the open second end; (ii) the housing is I-shaped, U-shaped, L-shaped, or T-shaped; or (iii) both (i) and (ii).

12. The method of claim 7, wherein: (i) the housing is monolithic in construction; (ii) the retainer ring is monolithic in construction; (iii) the verification tab is monolithic in construction; or (iv) any of (i)-(iii).

* * * * *